United States Patent
Thanayankizil et al.

(10) Patent No.: US 9,521,238 B1
(45) Date of Patent: Dec. 13, 2016

(54) ESTABLISHING MULTIPLE SHORT RANGE WIRELESS LINKS BETWEEN A VEHICLE AND A MOBILE DEVICE

(71) Applicant: GM Global Technology Operations LLC, Detroit, MI (US)

(72) Inventors: Lakshmi V. Thanayankizil, Rochester Hills, MI (US); Fan Bai, Ann Arbor, MI (US); Wen Gu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/799,266

(22) Filed: Jul. 14, 2015

(51) Int. Cl.
*H04W 12/06* (2009.01)
*H04W 4/04* (2009.01)
*H04M 1/725* (2006.01)
*H04B 1/3822* (2015.01)
*H04W 4/00* (2009.01)

(52) U.S. Cl.
CPC ......... *H04M 1/7253* (2013.01); *H04B 1/3822* (2013.01); *H04W 4/008* (2013.01); *H04W 12/06* (2013.01)

(58) Field of Classification Search
CPC ...... H04W 4/008; H04W 4/046; H04W 12/06; H04W 76/023; H04W 12/08; H04L 67/12; H04M 1/7253
USPC .................... 455/41.1, 41.2, 575.9
See application file for complete search history.

(56) References Cited

U.S. PATENT DOCUMENTS

2015/0208194 A1* 7/2015 Ito .................. H04W 4/008
455/41.2

* cited by examiner

*Primary Examiner* — Philip Sobutka
(74) *Attorney, Agent, or Firm* — Christopher DeVries; Reising Ethington P.C.

(57) ABSTRACT

A mobile communication system and a method of establishing a wireless connection between a vehicle and at least one mobile device. The method includes: establishing a first short range wireless communication (SRWC) link between the vehicle and the mobile device; and using the first SRWC link to establish a second SRWC link between the vehicle and the mobile device, wherein the first and second SRWC links use different SRWC protocols.

20 Claims, 3 Drawing Sheets

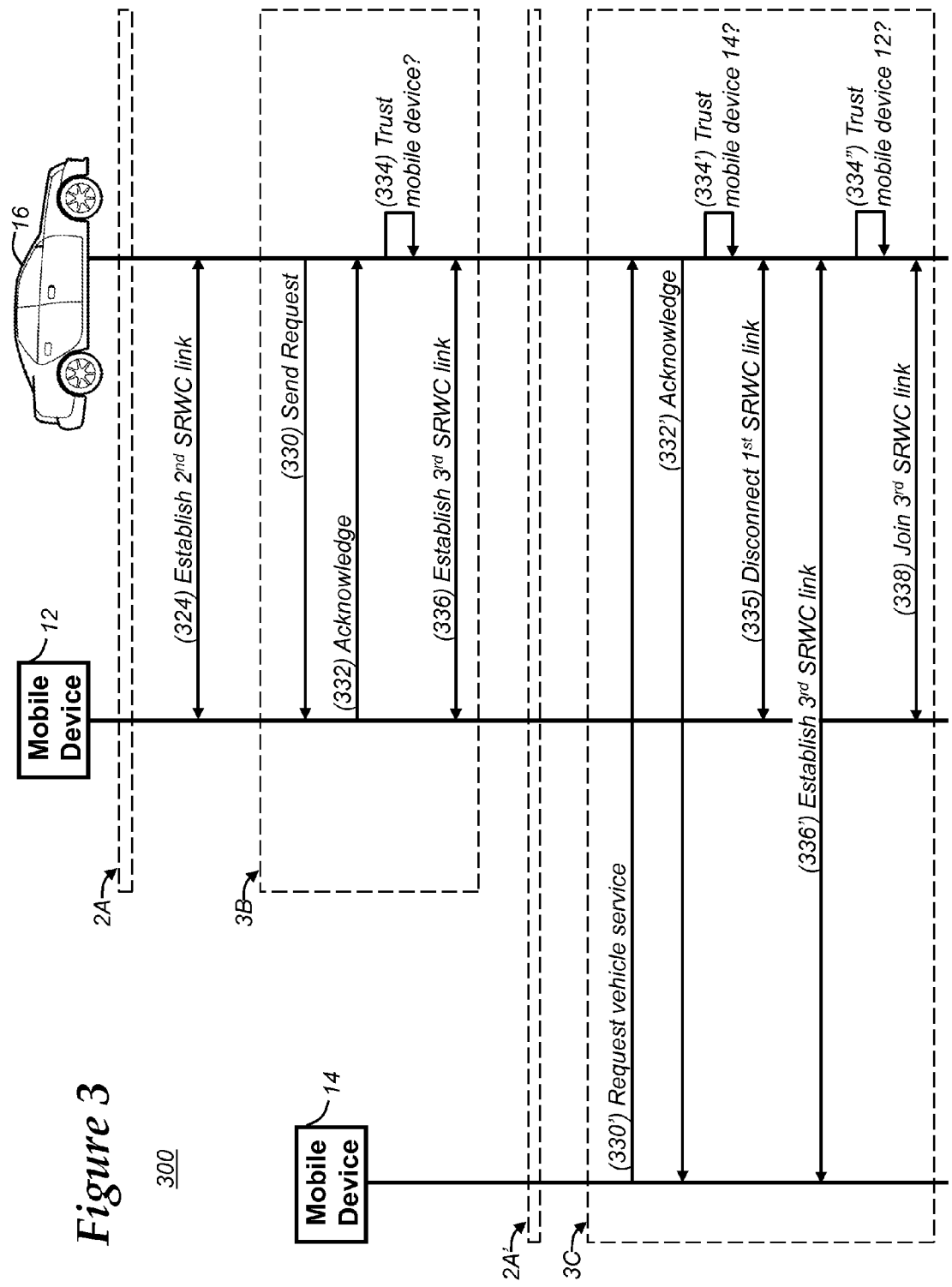

ESTABLISHING MULTIPLE SHORT RANGE WIRELESS LINKS BETWEEN A VEHICLE AND A MOBILE DEVICE

TECHNICAL FIELD

The present invention relates to short range wireless communication (SRWC) between a vehicle and a mobile device.

BACKGROUND

Modern vehicles may be capable of communicating with cellular telephones according to short range and cellular protocols; e.g., the vehicle may be equipped with various wireless and/or telematics equipment. In some instances, the vehicle does not attempt to connect over one short range protocol because of an existing connection; e.g., the vehicle does not utilize a discovery mode or the like due to the existing connection. Thus, there is a need for establishing a second wireless connection when a first wireless connection previously exists.

SUMMARY

According to an embodiment of the invention, there is provided method of establishing a wireless connection between a vehicle and a mobile device. The method includes: establishing a first short range wireless communication (SRWC) link between the vehicle and the mobile device; and using the first SRWC link to establish a second SRWC link between the vehicle and the mobile device, wherein the first and second SRWC links use different SRWC protocols.

According to another embodiment of the invention, there is provided method of establishing a wireless connection between a vehicle and a mobile device. The method includes: establishing a first short range wireless communication (SRWC) link between the vehicle and the mobile device; receiving at the vehicle credentials from the mobile device following a determination at the mobile device that the vehicle is a trusted device; determining at the vehicle to perform an out-of-band service associated with the mobile device; and in response to the determination, establishing a second SRWC link and providing the out-of-band service.

According to another embodiment of the invention, there is provided method of establishing a wireless connection between a vehicle and a mobile device. The method includes: establishing a first short range wireless communication (SRWC) link between the vehicle and a first mobile device; establishing a second SRWC link between the vehicle and a second mobile device; receiving a request from the second mobile device to establish a third SRWC link using the second SRWC link; and in response to the request, disconnecting the first SRWC link and establishing the third SRWC link between the vehicle and the second mobile device.

BRIEF DESCRIPTION OF THE DRAWINGS

One or more embodiments of the invention will hereinafter be described in conjunction with the appended drawings, wherein like designations denote like elements, and wherein:

FIGS. 2 and 3 are flow diagrams illustrating embodiments using the communication system of FIG. 1.

DETAILED DESCRIPTION OF THE ILLUSTRATED EMBODIMENT(S)

The communication system and method described below pertains to interactions between a vehicle electronics device—e.g., such as a vehicle head unit—and one or more mobile devices. The head unit and mobile device(s) may be capable of communicating over multiple short range wireless communication protocols (e.g., Wi-Fi, Wi-Fi Direct, Bluetooth, etc.). In some implementations, it may be desirable to switch between protocols without the user of the mobile device needing to authenticate itself (e.g., by providing a passcode or key), e.g., following an initial authentication. However, some protocol standards have no mechanism or means to perform an auto-verification on subsequent connections—Wi-Fi Direct is one such example. Thus, as will be explained in greater detail below, the system enables a vehicle electronics device and a mobile device to use a second protocol—an out-of-band protocol—to establish a second connection without the need for user input verification at the time of the connection.

Communications System—

Figure 1:
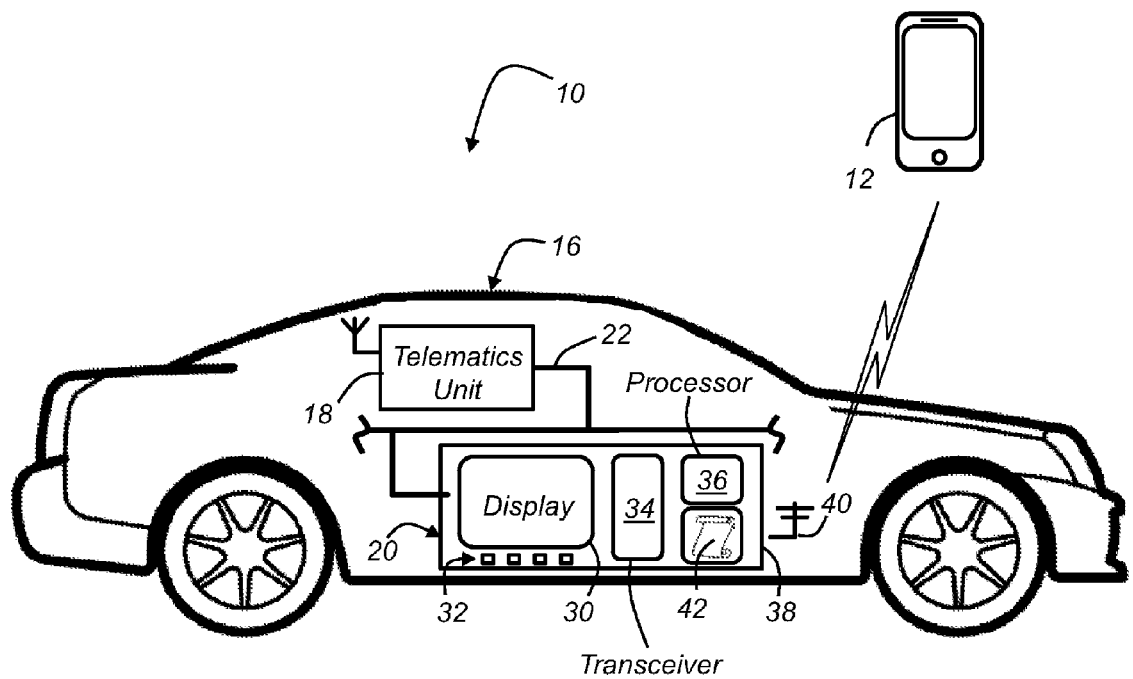
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more a mobile devices 12, 14 and a vehicle 16 which may comprise a telematics unit 18 and a vehicle infotainment system (VIS) or head unit 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Mobile devices 12, 14 may be any electronic devices capable of cellular communication, short range wireless communication (SRWC), or both. In some implementations, mobile device 12 and device 14 may be identical. Thus, only mobile device 12 will be described below; however, it will be appreciated that the following description may apply equally to mobile device 14. For example, cellular communication by mobile device 12 may include the ability to place and receive voice and/or data calls across a wide geographic area where transmissions are facilitated by a wireless carrier system and wireless service provider (e.g., utilizing communication technologies such as AMPS, CDMA, GSM/GPRS, LTE, etc.). Further, a user of the mobile device 12 may receive cellular services according to a subscription agreement with a third-party facility such as the wireless service provider. SRWC protocols usable by the mobile device 12 include various 802.11 protocols (e.g., a Wi-Fi protocol), a Wi-Fi Direct protocol, a Bluetooth protocol, a Bluetooth Low Energy (BLE) protocol, a Near-Field Communication (NFC) protocol, a ZigBee™ protocol, and a WiMAX protocol, just to name a few non-limiting examples.

Mobile device 12 may include any suitable user interface (including a display and input controls—e.g., pushbuttons, switches, touch screen, or any combination thereof). In addition, it further should be appreciated that device 12 may include an operating system and software stored on memory and both executable by a processor. Mobile device 12 may further include additional electronic circuitry including one or more wireless communication transceivers (e.g., one or more cellular chipsets, one or more SRWC chipsets, or both). As will be described below, in at least one implementation, mobile device 12 may include at least two SRWC chipsets enabling the mobile device to communicate concurrently with vehicle 16 via two SRWC chipsets—one communication being out-of-band with the other. As used herein, an out-of-band communication is a wireless data communication that is separate from a second wireless data communication. The first and second wireless data communications may overlap in time (e.g., occur at least partially concurrently). And in at least one implementation, the wireless out-of-band communication uses a different protocol than the second wireless data communication. For example according to the method described below, an established out-of-band link between mobile device 12 and vehicle 16 could be a Wi-Fi link (e.g., 802.11), and the out-of-band link may be used to establish a second link therebetween (e.g., a Wi-Fi Direct link). Or in another example, the out-of-band link could utilize BLE or NFC, which may be used to establish another link (e.g., via Wi-Fi Direct). These of course are merely examples; other wireless protocols may be used as the out-of-band protocol or the established protocol—including any suitable wireless protocol that is cellular, SRWC, or a combination thereof.

Non-limiting examples of the mobile device 12 include a cellular telephone, a personal digital assistant (PDA), a Smart phone, a personal laptop computer or tablet computer having two-way communication capabilities, a netbook computer, a notebook computer, or any suitable combinations thereof. The mobile device 12 may be used inside or outside of vehicle 16 by the vehicle user who may be a vehicle driver or passenger. It should be appreciated that the user does not need to have ownership of the mobile device 12 or the vehicle 16 (e.g., the vehicle user may be an owner or a licensee of either or both).

Vehicle 16 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 16 may include the telematics unit 18 and the VIS 20, as well as other electronics such as a microphone, one or more pushbuttons or other control inputs, one or more visual displays, and a number of vehicle system modules (VSMs) for controlling or regulating various vehicle subsystems (these other electronics are not shown). The telematics unit 18, VIS 20, and the VSMs (and other devices not shown) may be interconnected or electrically coupled by one or more wired communication networks 22 (e.g., a wired bus) or by one or more short range wireless communication (SRWC) networks.

Telematics unit 18 can be an OEM-installed (embedded) or aftermarket device that is installed in the vehicle and that enables wireless voice and/or data communication over a wireless carrier system and via wireless networking. This enables the vehicle 16 to communicate with a data service center (e.g., for backend functionalities), other telematics-enabled vehicles, and some other entities or devices (such as mobile devices 12, 14). The telematics unit preferably uses radio transmissions to establish a communications channel (a voice channel and/or a data channel) with the wireless carrier system so that voice and/or data transmissions can be sent and received over the channel. By providing both voice and data communication, telematics unit 18 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit) and data communication (e.g., to provide GPS location data or vehicle diagnostic data to a data service center), the system can utilize a single call over a voice channel and switch as needed between voice and data transmission over the voice channel, and this can be done using techniques known to those skilled in the art. Cellular communication using the telematics unit 18 may be carried out over the wireless carrier system using a wireless service provider (WSP); and it should be appreciated that the WSP associated with the telematics unit 18 need not be the same WSP associated with the mobile devices 12, 14.

According to one embodiment, telematics unit 18 utilizes cellular communication according to either GSM, CDMA, or LTE standards and thus includes a standard cellular chipset for voice communications like hands-free calling, a wireless modem for data transmission, an electronic processing device or processor, one or more digital memory devices, and at least one antenna. It should be appreciated that the modem can either be implemented through software that is stored in the telematics unit and is executed by the processor, or it can be a separate hardware component located internal or external to telematics unit 18. The modem can operate using any number of different standards or protocols such as LTE, EVDO, CDMA, GPRS, and EDGE. Wireless networking between the vehicle and other networked devices can also be carried out using telematics unit 18. For this purpose, telematics unit 18 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). In at least one embodiment, telematics unit 18 may serve as an intermediary device between the VIS 20 and mobile devices 12, 14; e.g., mobile devices 12, 14 may communicate with telematics unit 18 and the telematics unit 18 may provide that information to and/or from the VIS 20 (or VIS 20 may initiate communications with telematics unit 18 which then provides communication to and/or from mobile devices 12, 14). The telematics unit 18 is merely one example of a device that suitably may act as an intermediary device; other intermediary devices also are contemplated.

Vehicle infotainment system (VIS) 20 may be any suitable entertainment or infotainment unit which may be embedded in vehicle 16. It may be part of a vehicle audio system and include a display 30 and an input/output interface 32. Further, display 30 may be interactive or non-interactive. VIS 20 further may include a short range wireless communication (SRWC) transceiver 34, one or more processors 36, memory 38, and at least one antenna 40. Transceiver 34 may support one or more SRWC links or connections using antenna 40 according to any suitable protocol (including Wi-Fi, Wi-Fi Direct, Bluetooth, Bluetooth Low Energy (BLE), Near-Field Communication (NFC), just to name a few). Thus, in at least one implementation, transceiver 34 may comprise two or more chipsets, and antenna 40 may be a multi-function antenna (supporting a variety of protocol frequencies).

Processor 36 can be any type of device capable of processing electronic instructions including microprocessors, microcontrollers, host processors, controllers, vehicle communication processors, and application specific integrated circuits (ASICs). It can be a dedicated processor used only for VIS 20 or can be shared with other vehicle systems (such as the telematics unit 18). Processor 36 executes various types of digitally-stored instructions 42, such as software or firmware programs stored in memory 38, which enable VIS 20 to provide a wide variety of services. For instance, processor 36 can execute programs or process data to carry out at least a part of the method discussed below—supporting and enabling two or more communication links between one or more mobile devices, one link being an out-of-band link. According to one embodiment, processor 36 may facilitate establishing a second wireless link using the out-of-band link.

The memory 38 may include computer usable or readable medium, (which include one or more storage devices or articles). Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one embodiment, memory 38 is a non-transitory computer readable medium.

Method—

Figure 2:
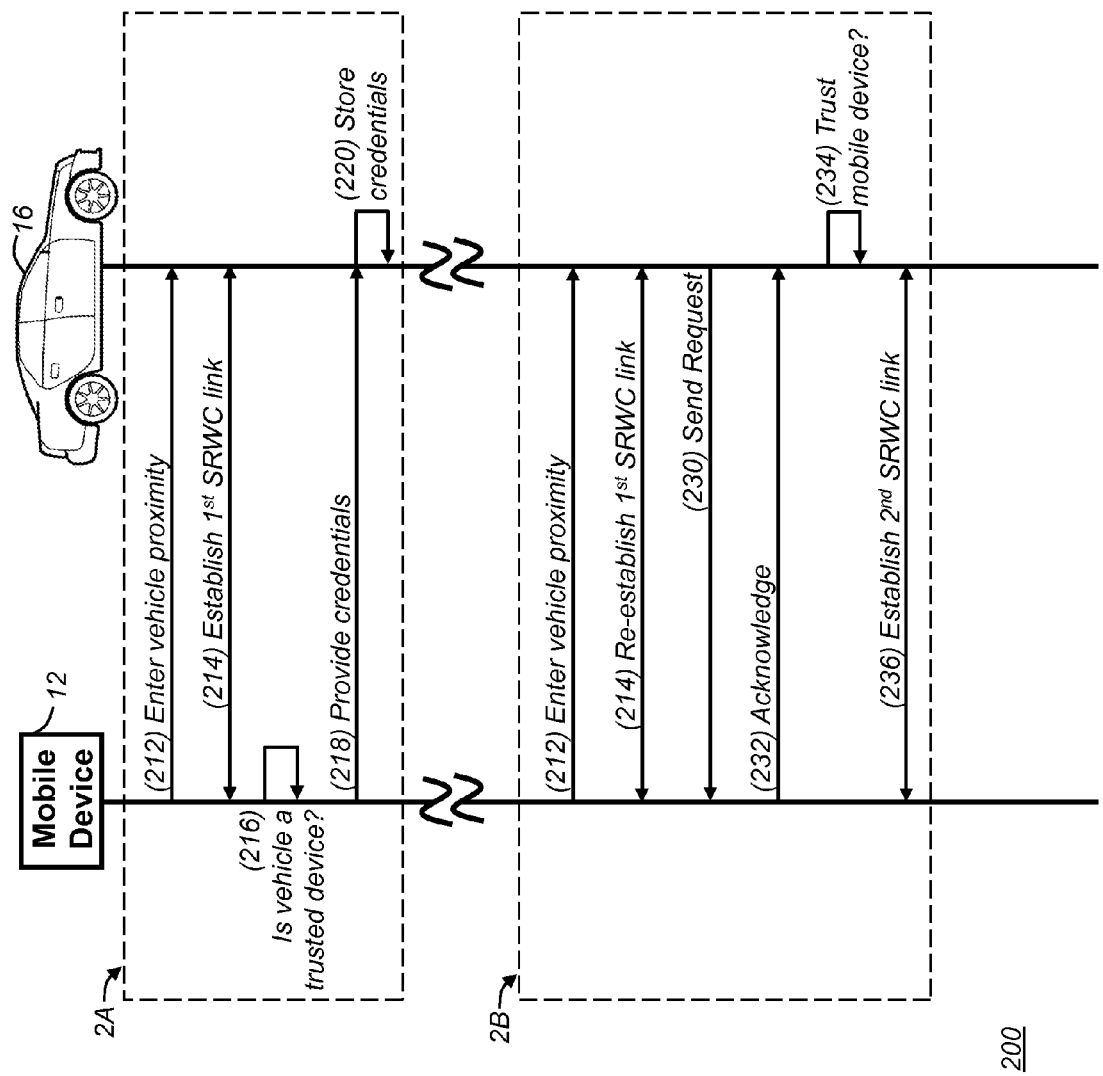

Turning now to FIG. 2, there is shown a flow diagram illustrating a method 200 of establishing a wireless connection between a vehicle and a mobile device. The method enables an out-of-band SRWC connection or link to be established between mobile device 12 (or 14) and the vehicle 16—e.g., between mobile device 12 and the VIS 20 directly or between mobile device 12 and the VIS 20 indirectly (e.g., via another electronic vehicle device such as telematics unit 18). Method 200 begins with step 212.

Steps 212, 214, 218, and 220 (group 2A) may represent an initial process associated with establishing a trust relationship between the vehicle 16 and mobile device 12. In step 212, mobile device 12 and vehicle 16 are in proximity of one another (e.g., a user may carry mobile device 12 as the user enters vehicle 16). Step 214 may follow step 212.

In step 214, a first SRWC link is established between vehicle 16 and mobile device 12. Establishing such a link may use any suitable authentication techniques known in the art. The initial establishment or the first time the vehicle 16 and mobile device 12 connect, the establishment may require the mobile device 12, the vehicle 16, or both to enter a password or code into the respective devices. In at least one embodiment, the first SRWC link is a Wi-Fi link; however any other wireless link is possible (e.g., Bluetooth, Bluetooth low energy, cellular, etc.). Following step 214, method 200 proceeds to step 216.

In step 216, mobile device 12 may determine whether vehicle 16 is a trusted device. This may occur in a variety of ways. For example, mobile device 12 may accept a passcode or other data indicating that the vehicle 16 is trusted by the user. In addition, this could occur as part of step 214. In other implementations, mobile device 12 may receive data associated with a vehicle identifier, VIS identifier, or telematics unit identifier—and use this data to determine that vehicle 16 may be trusted. Or in other embodiments, mobile device 12 may communicate with a backend system associated with providing vehicle services to vehicle 16 and determine to trust the vehicle based on these communications. Of course, any combination of these steps may be used also. Further, it should be appreciated that these are merely examples of how a trust determination may be made, and other implementations also exist. Step 218 follows step 216.

In step 218, mobile device 12 provides credentials to the vehicle 16 in response to the trust determination made in step 216. Credentials may include a mobile device identifier, a password, PIN, or other code associated with one or more SRWC protocols, and an identifier of the device to which to connect (e.g., the VIS 20). In at least one embodiment, the credentials include any information or data needed to establish a Wi-Fi Simple Config or a Wi-Fi Protected Setup (e.g., using a PIN process, a push button process, an NFC process, or a USB process—which processes are part of the Wi-Fi network security standard and understood by skilled artisans). In at least one embodiment, the credentials are associated with an SRWC link different from the first SRWC link; e.g., a Wi-Fi Direction connection. Following step 218, method 200 proceeds to step 220.

In step 220, in response to receiving the credentials from mobile device 12, vehicle 16 stores these credentials in vehicle memory (e.g., in VIS memory 38). These stored credentials may be used immediately or in future SRWC links between the vehicle 16 and mobile device 12.

Method 200 may proceed directly to step 230 in some implementations. However, in the example shown in FIG. 2, following step 220, the user (and mobile device 12) leave vehicle 16 and then later return—as illustrated by the break in the flow diagram. Group 2B illustrates a number of steps: steps 212 and 214 (which were described as above) and steps 230, 232, 234, and 236. In some embodiments, steps 212 and 214 occur automatically when the user returns to the vehicle 16 (e.g., an automatic re-connect to a previously connected SRWC connection such as Wi-Fi, Bluetooth, etc.). Then following step 214, vehicle 16 may provide a request to mobile device 12 to perform a vehicle service which requires a different SRWC link than that established in step 214 [step 230]. By way of example and not intending to be limiting, vehicle 16 may provide a phone projection request to mobile device 12; phone projection techniques enable images and video being displayed on mobile device 12 to be provided to the display of another device (e.g., such as VIS display 30). One commercially available phone projection technology is Miracast™. Miracast™ is merely an example; other phone projection technology may be used also. The request of step 230 may be provided via the first SRWC link; and in at least one embodiment, the first SRWC link is a Wi-Fi link (in at least one other embodiment, the first SRWC link is Bluetooth, BLE, or NFC). It should be appreciated that in some embodiments, the request to perform a vehicle service may be not suitable or technologically feasible using the first SRWC link. For example, continuing with the phone projection example, a Miracast™ phone projection service is not possible using Wi-Fi (as set forth in the standard); however, it may be possible via another SRWC protocol such as Wi-Fi Direct. Following step 230, method 200 proceeds to step 232.

In step 232, user of the mobile device 12 may desire the vehicle service offered in the request and may provide an assent or acknowledgement to vehicle 16. For example, mobile device 12 may accept the phone projection request. Step 234 may follow step 232.

In step 234, vehicle 16 may determine whether mobile device 12 should be trusted to establish a second SRWC link prior to providing the vehicle service(s). This may include vehicle 16 validating any suitable credentials associated with mobile device 12; e.g., validating whether the credentials provided in step 218 and stored in step 220 indicate that the vehicle 16 is permitted to establish the second SRWC link. In some embodiments, step 234 may be completed prior to sending the vehicle service request (e.g., prior to step 230). Continuing with the phone projection request example, vehicle 16 may determine whether the credentials provided in step 218 enable a Wi-Fi Direct connection to enable the phone projection. Again, typically this would require the mobile device user to manually enter at least a portion of the credentials into the mobile device and send it to the vehicle (e.g., VIS 20). Further, when using protocols like Wi-Fi Direct, the standard provides no mechanism in which the second SRWC link can be re-established automatically on subsequent connections either. Thus, the user will need to repetitively provide the credentials at each second SRWC connection. Here, step 234 (and step 236) may occur automatically and seamlessly; e.g., without user interaction. In other embodiments, even the acknowledgement (step 232) may be automated, e.g., pre-configured to acknowledge the request of step 230 (thus, steps 232, 234, and 236 may be automated). This automation may improve the user experience enabling the user to more quickly and efficiently be validated to receive the vehicle service(s). When the credentials are validated, the method 200 may proceed to step 236. When the credentials are not validated, the method 200 may end.

In step 236, a second SRWC link is established—e.g., continuing with the phone projection example, a Wi-Fi Direct link is established, and the mobile device 12 may provide phone projection data to the VIS 20 for viewing on display 30. In addition in some embodiments, the establishing the second SRWC link may include a disconnection of the first SRWC link; however, this is not required.

It should be appreciated that while the example used to describe method 200 above included Wi-Fi and Wi-Fi Direct that other protocols could also be used in carrying out the method. Also, other embodiments may also exist. For example, mobile device 12 may initiate a request for a vehicle service (in step 230) and vehicle 16 could perform the acknowledgement (in step 232).

FIG. 3 illustrates a flow diagram of a method 300 of establishing a wireless connection between vehicle 16 and at least one mobile device (e.g., device 12, 14, or both). As discussed with respect to method 200, method 300 enables an out-of-band SRWC connection or link to be established between mobile device 12 (or 14) and the vehicle 16—e.g., between mobile device 12 and the VIS 20 directly or between mobile device 12 and the VIS 20 indirectly (e.g., via another electronic vehicle device such as telematics unit 18). Method 300 may begin by performing steps 212, 214, 216, 218, and 220 (group 2A of FIG. 2). Thus, credentials associated with at least one SRWC link may be stored at the vehicle 16. Following steps 212-220, method 300 may proceed to step 324.

In step 324, mobile device 12 and vehicle 16 may establish a second SRWC link that is out-of-band with the first SRWC link. The second SRWC link may be established at any suitable time, and in one embodiment, the second SRWC link will be used to establish a third SRWC link (as will be discussed below). In at least one embodiment, the second SRWC link is one of Bluetooth, BLE, or NFC. However, it will be appreciated that other SRWC protocols may be used. Following step 324, method 300 proceeds to step 330 (group 3B includes steps 330, 332, 334, and 336).

In step 330, vehicle 16 may provide a request to mobile device 12 to perform a vehicle service which requires a different SRWC link than that established in either step 214 or step 324 (i.e., a third SRWC link). The request may be sent via the established second SRWC link (e.g., Bluetooth, BLE, NFC, etc.) or even via the first SRWC link (e.g., Wi-Fi). Again, by way of example and not intending to be limiting, the third SRWC link could be Wi-Fi Direct and the request from vehicle 16 could be a phone projection request to mobile device 12 (which phone projection may use Wi-Fi Direct). Following step 330, method 300 proceeds to step 332.

In step 332, user of the mobile device 12 may desire the vehicle service offered in the request and may provide an assent or acknowledgement to vehicle 16 via the second SRWC link. For example, mobile device 12 may accept the phone projection request via a communication over Bluetooth, BLE, NFC, etc. (Or as discussed above with respect to method 200, in other embodiments, the request (step 330) could come from the mobile device 12, and the response (step 332) could come from vehicle 16). Step 334 follows step 332.

In step 334, the vehicle 16 may validate whether the mobile device has permission to establish a third SRWC link to perform the vehicle service (e.g., the desired phone projection). This step may be the same as step 234 discussed above. Following step 334, the method may proceed to step 336 when the credentials of mobile device 12 are validated.

In step 336, a third SRWC link is established without the user needing to perform a manual procedure for validation and connection—e.g., continuing with the phone projection example, a Wi-Fi Direct link is established, and the mobile device 12 may provide phone projection data to the VIS 20 for viewing on display 30. In addition, in some embodiments, the establishing the third SRWC link may include a disconnection of the first or second SRWC links; however, this is not required.

Method 300 illustrates another embodiment as well that includes another device: the mobile device 14. In at least one embodiment, at least the following steps are performed: group 2A (steps 212-220), group 2A', and group 3C. By way of illustration only, the first SRWC link between vehicle 16 and mobile device 12 could include a Wi-Fi link, a Bluetooth link, a BLE link, or an NFC link.

Following steps 212-220 (group 2A), the embodiment proceeds to group 2A' which includes steps that are substantially similar to the steps of group 2A, except that instead these steps (in group 2A'), are associated with vehicle 16 and mobile device 14 (instead of being associated with vehicle 16 and mobile device 12). Thus, mobile device 14 credentials may be stored at vehicle 16 (e.g., in VIS memory 38). Method 300 then proceeds to the steps of group 3C (which includes steps 330', 332', 334', 335, 336', 334", and 338—where like numerals denote like or similar steps or functions to those already described).

In step 330', mobile device 14 requests a vehicle service of vehicle 16, and in step 332', vehicle 16 acknowledges or accepts the request (e.g., via the first SRWC link). In at least one implementation, the request pertains to a vehicle service that requires a SRWC link that is not currently established with vehicle 16 (e.g., with VIS 20). Continuing with the example above, the request from mobile device 14 may be a phone projection request which may use a Wi-Fi Direct link. Following steps 330' and 332', the vehicle 16 may determine at step 334' whether to trust mobile device 14. Provided this trust determination is made, method 300 may proceed to step 335.

It should be appreciated that in at least one embodiment, vehicle 16 will request a Wi-Fi Direct connection if a Wi-Fi (e.g., 802.11) link already exists (in accordance with protocol standards). Thus, in one embodiment, mobile device 14 may need to initiate the request (at step 330'). However, in other embodiments (where other SRWC protocols are involved), vehicle 16 could initiate the request and device 14 may perform the acknowledgement (at step 332'). It should also be appreciated that in other implementations, the request and/or acknowledgement could be via the second SRWC link instead of the first SRWC link (e.g., where mobile device 14 so establishes with vehicle 16).

In step 335, vehicle 16 may disconnect the first SRWC link. This may occur for example when the first SRWC link is Wi-Fi and the desired third SRWC link is Wi-Fi Direct; e.g., VIS 20 in some instances may not be configured to sustain both a Wi-Fi link and a Wi-Fi Direct link concurrently. Or in some embodiments, the mobile device may not be configured to sustain both Wi-Fi and Wi-Fi Direct links concurrently. In these and like instances, the first SRWC link is disconnected. In other embodiments, method 300 will skip step 335. Regardless, method 300 then proceeds to step 336'.

In step 336', the third SRWC link is established—and this may be generally similar to that described in step 336. In at least one embodiment, vehicle 16 provides a vehicle service to mobile device 14 over the third SRWC link—e.g., engaging in a phone projection session over a Wi-Fi Direct link.

In some embodiments, the method 300 may end with step 336' (not performing steps 334" and 338). For example, in some instances, mobile device 14 is compatible with 2.4 GHz and 5 GHz technologies and mobile device 12 is compatible with only 2.4 GHz technology. If, for example, the third SRWC link is Wi-Fi Direct or the like and uses 5 GHz technology whereas mobile device 12 is not compatible with 5 GHz technology, the method ends. For example, vehicle 16 may determine that mobile device 12 credentials stored in memory 38 indicate incompatibility with the 5 GHz connection. Thus in some implementations, mobile device 14 is given priority over mobile device 12; and thus in some implementations for example, devices with phone projection capability (or other newer application software technologies) are given higher priority.

In other instances, mobile device 12 may be connectable to the third SRWC link. In one implementation, mobile device 12 may have been connected to Wi-Fi via a 5 GHz connection (i.e., the first SRWC link was 5 GHz Wi-Fi). Thus, in step 334", vehicle 16 may determine that mobile device 12 is both compatible and a trusted device, and in steps 338, mobile device 12 may be joined to the third SRWC link (already established). Further, in at least one implementation, this occurs automatically—e.g., not requiring interaction by the user of mobile device 12.

Other embodiments also exist. For example, the second SRWC link shown in FIG. 3 could be used to provide credentials to vehicle 16. In at least some implementations, the first SRWC link is Wi-Fi and the second SRWC link is one of Bluetooth, BLE, or NFC; and using the second SRWC may minimize bandwidth usage over the first SRWC link which may be providing data between mobile device 12 and vehicle 16.

Thus, there has been described a communication system that includes a vehicle having wireless communication capability and at least one mobile device. The mobile device may establish a second SRWC link using a first SRWC link that is out-of-band with the first SRWC link. In at least some implementations, the credentials of the second SRWC link are communicated over the first SRWC link; further set-up communications (e.g., requests and acknowledgements) pertaining to the second SRWC link may occur via the first SRWC link. In addition, in at least some embodiments, a second mobile device connects with the vehicle via another SRWC link and is given priority over the first (and previously connected) mobile device.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a wireless connection between a vehicle and a mobile device, comprising the steps of:
   establishing a first short range wireless communication (SRWC) link between the vehicle and the mobile device;
   sending a request from the vehicle to the mobile device to perform a vehicle service that requires a second SRWC link different from the first SRWC link; and
   using the first SRWC link to establish the second SRWC link between the vehicle and the mobile device,
   wherein the first and second SRWC links use different SRWC protocols.

2. The method of claim 1, wherein using the first SRWC link includes providing between the vehicle and the mobile device credentials associated with the second SRWC link.

3. The method of claim 2, wherein credentials of the mobile device are provided to the vehicle via the first SRWC link and stored in vehicle memory.

4. The method of claim 2, wherein the second SRWC link is a Wi-Fi Direct connection, wherein providing the credentials via the first SRWC link automates a Wi-Fi Direct authentication process between the vehicle and mobile device.

5. The method of claim 1, wherein the first SRWC link is an out-of-band connection with respect to the second SRWC link.

6. The method of claim 5, wherein the first SRWC link is one of a Wi-Fi connection, a Bluetooth connection, a Bluetooth Low Energy (BLE) connection, or a Near-Field Communication (NFC) connection.

7. The method of claim 6, wherein the vehicle and mobile device are connected according to a third SRWC link during the establishment of the first SRWC and during at least a portion of the using of the first SRWC link to establish the second SRWC link.

8. The method of claim 7, wherein the establishing step (establishing the first SRWC link) is between the vehicle and a first mobile device, wherein the using step (using the first SRWC link to establish the second SRWC link) is between the vehicle and the first mobile device, wherein at least a portion of the establishing and using steps occur while a second mobile device communicates with the vehicle via a third SRWC link.

9. The method of claim 8, further comprising terminating the third SRWC link when the second SRWC link is established.

10. The method of claim 1, wherein the first and second SRWC links utilize a vehicle infotainment system (VIS) at the vehicle.

11. A method of establishing a wireless connection between a vehicle and a mobile device, comprising:
   establishing a first short range wireless communication (SRWC) link between the vehicle and the mobile device;
   receiving at the vehicle credentials from the mobile device following a determination at the mobile device that the vehicle is a trusted device;
   determining at the vehicle to perform an out-of-band service associated with the mobile device; and
   in response to the determination, establishing a second SRWC link and providing the out-of-band service.

12. The method of claim 11, wherein the determination to perform the out-of-band service includes providing a request to the mobile device via the first SRWC link and receiving a response therefrom.

13. The method of claim 11, wherein the out-of-band service is associated with phone projection.

14. The method of claim 11, wherein the first and second SRWC links utilize a vehicle infotainment system (VIS) at the vehicle.

15. A method of establishing a wireless connection between a vehicle and a mobile device, comprising:
   establishing a first short range wireless communication (SRWC) link between the vehicle and a first mobile device;
   establishing a second SRWC link between the vehicle and a second mobile device;
   receiving a request from the second mobile device to establish a third SRWC link using the second SRWC link; and
   in response to the request, disconnecting the first SRWC link and establishing the third SRWC link between the vehicle and the second mobile device.

16. The method of claim 15, further comprising connecting the first mobile device to the vehicle via the established third SRWC link.

17. The method of claim 16, further comprising: prior to connecting the first mobile device to the vehicle via the third SRWC link, providing credentials from the first mobile device to the vehicle so that the first mobile device is connected automatically following its disconnection from the first SRWC link.

18. The method of claim 15, further comprising: prior to establishing the third SRWC link, providing credentials from the second mobile device to the vehicle.

19. The method of claim 18, wherein the request to establish the third SRWC link includes the credentials.

20. The method of claim 15, wherein the first, second, and third SRWC links utilize a vehicle infotainment system (VIS) at the vehicle.

* * * * *